(12) United States Patent
Katayama et al.

(10) Patent No.: US 8,547,201 B2
(45) Date of Patent: Oct. 1, 2013

(54) PROTECTIVE-CONTROL MEASURING SYSTEM AND DEVICE AND DATA TRANSMISSION METHOD

(75) Inventors: Shigeki Katayama, Kiyose (JP); Katsuhiko Sekiguchi, Tama (JP); Kazuto Fukushima, Aoba-ku (JP); Tsutomu Matsumoto, Yokohama (JP)

(73) Assignees: Kabushiki Kaisha Toshiba, Tokyo (JP); Yokohama National University, Yokohama (JP)

( * ) Notice: Subject to any disclaimer, the term of this patent is extended or adjusted under 35 U.S.C. 154(b) by 191 days.

(21) Appl. No.: 13/145,120

(22) PCT Filed: Dec. 28, 2009

(86) PCT No.: PCT/JP2009/007327
§ 371 (c)(1),
(2), (4) Date: Sep. 27, 2011

(87) PCT Pub. No.: WO2010/082284
PCT Pub. Date: Jul. 22, 2010

(65) Prior Publication Data
US 2012/0019355 A1 Jan. 26, 2012

(30) Foreign Application Priority Data
Jan. 19, 2009 (JP) .................... 2009-008823

(51) Int. Cl.
*G05B 19/00* (2006.01)
*G05B 23/00* (2006.01)
*H04L 29/06* (2006.01)
*H04L 9/32* (2006.01)
*G06F 11/30* (2006.01)
*G06G 7/04* (2006.01)

(52) U.S. Cl.
USPC ........... 340/5.6; 340/5.24; 713/161; 713/189; 713/170; 713/169; 726/17; 726/18; 726/19; 726/21

(58) Field of Classification Search
USPC ................... 380/44, 210, 259; 713/156, 175, 713/150, 190, 193
See application file for complete search history.

(56) References Cited

U.S. PATENT DOCUMENTS

| 7,360,075 | B2 * | 4/2008 | VanHeyningen et al. ...... 713/151 |
| 7,757,101 | B2 * | 7/2010 | Nonaka et al. ................ 713/194 |
| 7,870,380 | B2 * | 1/2011 | VanHeyningen et al. ...... 713/151 |

FOREIGN PATENT DOCUMENTS

| JP | 10 303881 | 11/1998 |
| JP | 2000 194262 | 7/2000 |

(Continued)

OTHER PUBLICATIONS

TS 62351-6, "Power systems management and associated information exchange-Data and communications security," IEC, p. 9, (2007).
Stinson, D.R., "Fundamental of Encryption Theory," ISBN4-320-02820-1, 1 page, (1996) (Original Version: Stinson, D.R., "Cryptography: Theory and Practice," 1995).

(Continued)

*Primary Examiner* — Steven Lim
*Assistant Examiner* — Pameshanand Mahase
(74) *Attorney, Agent, or Firm* — Oblon, Spivak, McClelland, Maier & Neustadt, L.L.P.

(57) ABSTRACT

According to one embodiment, when sending a transmission target main data 21, an authentication-tag generator unit 13 generates an authentication tag 23 by using a main data 21 and a key data 22 stored in a key-data storage unit 12. A transmitter/receiver unit 14 adds the authentication tag 23 to the main data 32 sends as a transmission data. When receiving the received data 24a, the transmitter/receiver unit 14 divides the received data into a main data 21a and an authentication tag 23a. The authentication-tag generator unit 13 generates an authentication tag 23b for comparison. A received-data authentication unit 15 determines whether or not those the received authentication tag 23a and the authentication tag for comparison 23b match with each other. A different key data is used every time upon the authentication-tag generation and use time of each key data during a set period is restricted.

11 Claims, 12 Drawing Sheets

(56) References Cited

FOREIGN PATENT DOCUMENTS

| JP | 2000 228821 | 8/2000 |
| JP | 2000 295209 | 10/2000 |
| JP | 2003 333023 | 11/2003 |
| JP | 2005 217907 | 8/2005 |

OTHER PUBLICATIONS

Shannon, C.E., "Communication Theory of Secrecy Systems," Bell Systems Technical Journal, vol. 28, pp. 656-715, (1949).
International Search Report issued Feb. 23, 2010 in PCT/JP09/007327 filed Dec. 28, 2009.

* cited by examiner

| HEADER | PROTECTIVE CONTROL DATA | AUTHENTICATION TAG | FOOTER |

24

$$(1,1,0) \overset{y}{=} \overset{x}{(1,0,0,1,0)} \overset{U}{\begin{pmatrix} 1 & 0 & 1 \\ 0 & 1 & 1 \\ 1 & 1 & 1 \\ 0 & 0 & 1 \\ 0 & 1 & 0 \end{pmatrix}} + \overset{v}{(0,1,0)}$$

PROTECTIVE-CONTROL MEASURING SYSTEM AND DEVICE AND DATA TRANSMISSION METHOD

TECHNICAL FIELD

The present invention relates to a system including a plurality of devices connected together through a communication network, and more particularly, to a protective-control measuring system for a power system.

RELATED ART

Recently, application of general-purpose network technologies, such as Ethernet (registered trademark) and TCP/IP, to a protective-control measuring system becomes popular. The problem always brought in this case is a cyber security countermeasure. Regarding the security technology for power communication, Non-patent Literature 1 discloses an authentication scheme using the SHA-1 algorithm.

However, various security algorithms currently popular like SHA-1 (Secure Hash Algorithm 1) defined in Non-patent Literature 1 are for assuring the security based on computational complexity as disclosed in Non-patent Literature 2. Hence, when the performance of computing machinery greatly improves or computationally efficient methods for solving the problem thereof is found in a future, such security algorithms based on computational complexity become insecure from the standpoint of security issues, so that it is necessary to replace such security algorithms with another secure algorithm.

Non-patent Literature 1: IEC 62351 "Power systems management and associated information exchange-Data and communications security"

Non-patent Literature 2: D. R. Stinson, "Fundamental of Encryption Theory" (ISBN4-320-02820-1) (Original Version: "CRYPTOGRAPHY: Theory and Practice")

Non-patent Literature 3: C. E. Shannon, "Communication theory of secrecy systems", Bell Systems Technical Journal, 28, 1949, 656-715

In general, it is necessary to consider three factors in a security countermeasure: secrecy, authentication, and integrity. In the case of the protective-control measuring system, because of its mission-critical characteristic, authentication is important rather than the secrecy of data. Moreover, the transmission path is often a narrow band. In particular, in the case of a system which causes a plurality of protective relay devices to exchange data with each other in order to perform a current differential operation, because of its operational characteristic, a high real-time feature is requisite for an authentication process. Moreover, the protective-control measuring system often needs to be operated for a long period nondisruptively, which results in a restriction that a change of the algorithm in the device is not easy. Therefore, direct application of the security technology generally used in the IT industry and based on computational complexity to the protective-control measuring system is not suitable.

On the other hand, Non-patent Literature 2 discloses a security technology from the standpoint of an information amount (entropy) based on the Shannon's information theory, and the theoretical study for the security based on the information-theoretic methods has been developed on the basis of Non-patent Literature 3. An example of such information-theoretic security technology is the one-time pad scheme that sends data while changing a key for each sending. Such information-theoretic security technology needs a key with a large size in typical schemes, so that there are few reports on the practical use of such a security technology in the field of exchanging data extremely frequently like the protective-control measuring system for a power system.

SUMMARY OF INVENTION

The present invention has been made in order to overcome the above-explained problem of the conventional technologies, and it is an object of the present invention to establish a practical information-theoretic security technology which retains the data size of a key within a range realizable in practice and which can be easily applied to protective-control measurement and to provide highly secure and reliable protective-control measuring systems and devices and data transmission methods using such an information-theoretic security technology.

The present invention comprises a protective-control measuring system which includes a plurality of devices including a protective-control measuring device that performs protective-control measurement on a power system, the plurality of devices being connected together over a transmission path and exchanging data one another, and each device has following technical features. That is, each device comprises: a key-data storage unit for storing a set number of key data, the set number being predetermined; an authentication-tag generator unit which generates an authentication tag by using a transmission target main data and a piece of key data stored in the key-data storage unit; a transmitter/receiver unit which adds the generated authentication tag to the main data used for generating the authentication tag in order to generate transmission data, sends the transmission data to the transmission path, receives data from the transmission path, and divides the received data into the main data and the authentication tag; and received-data authentication unit which authenticates a validity of the received data by using the main data and the authentication tag both in the received data received by the transmitter/receiver unit, and the key data stored in the key-data storage unit. Moreover, the protective-control measuring system employs, as an information-theoretic security scheme, a scheme of changing the key data to be used every time upon generation of the authentication-tag by the authentication-tag generator unit, and also employs use-time restriction of prohibiting the use of each key data equal to or greater than a predetermined set time during a predetermined set period.

According to the present invention with such features, data that is a combination of transmission target main data and an authentication tag generated by using the main data is sent, and the authentication tag generated based on the main data contained in received data is compared with the authentication tag contained in the received data at the receiver side, so that it becomes possible to detect presence/absence of data substitution over the transmission path. The key data used when an authentication tag is generated is changed every time upon data transmission, so that the security based not on computational complexity but on information theory can be attained.

Moreover, by employing use-time restriction that prohibits the use of the same key data equal to or greater than a set time within a set period, an operation cycle derived from the lifetime of a protective-control measuring device can be set as the set period, and the probability that substitution and impersonation occur during the operation cycle can be remarkably reduced by setting the small set time. In particular, by setting a restriction in time that is the set period, the size of key data can be retained within a range realizable in the operation of the protective-control measuring device without making the size of key data infinitely large.

Furthermore, the protective-control measuring device and data transmission method according to the present invention are derived based on the features of the above-explained protective-control measuring system from the standpoint of a device configuring that system and a data transmission method of such a system.

According to the present invention, there are provided highly secure and reliable protective-control measuring system and device, and data transmission method using a practical information-theoretic security technology which can retain the data size of a key within a range realizable in practice and which can be easily applied to a protective-control measurement.

BEST MODE FOR CARRYING OUT THE INVENTION

Embodiments of a protective-control measuring system according to the present invention will be explained below in detail with reference to the accompanying drawings.

First Embodiment

[System Configuration]

Figure 1:
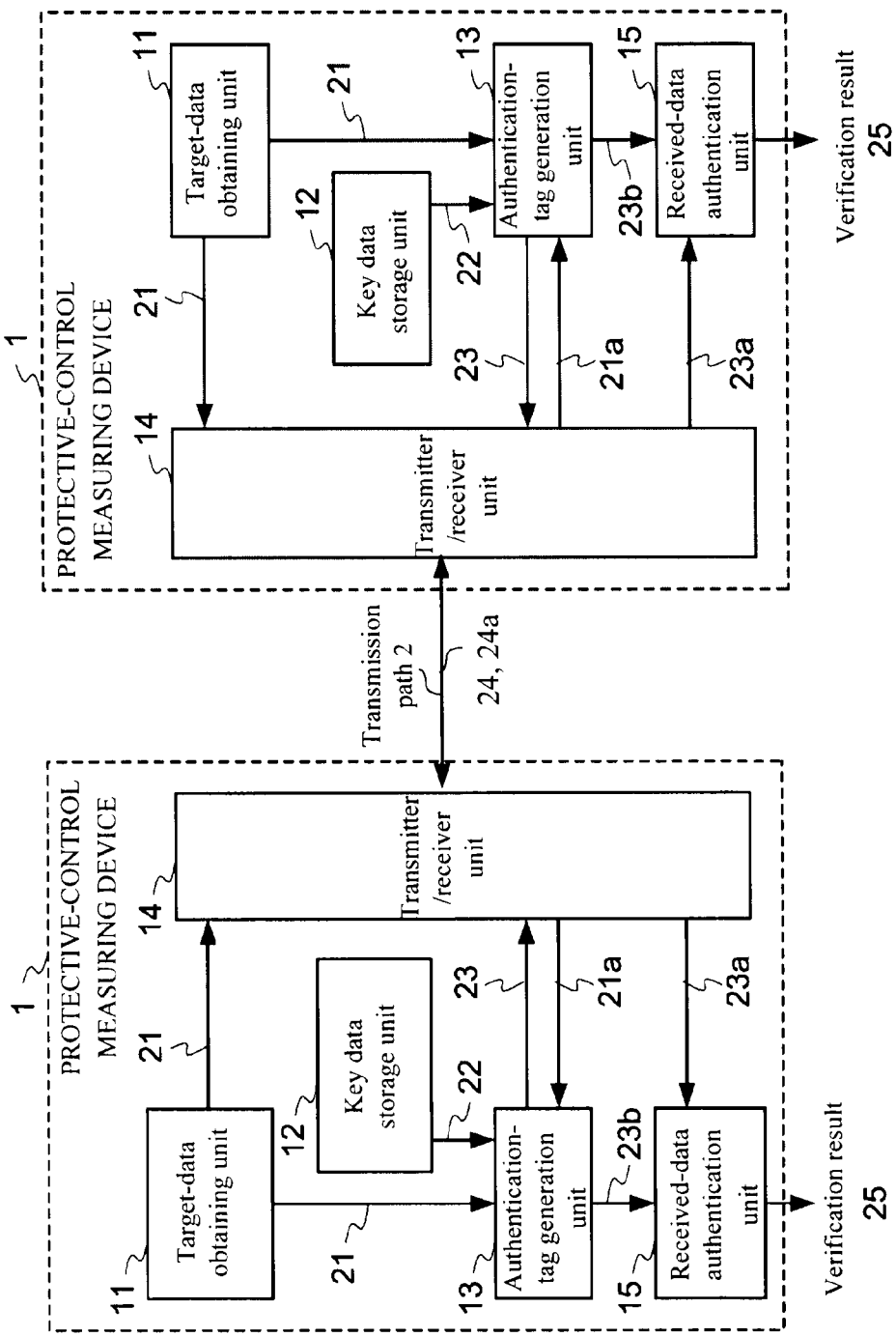
FIG. 1 is a block diagram showing a configuration of a protective-control measuring system of the first embodiment according to the present invention.

FIG. 1 is a block diagram showing a configuration of a protective-control measuring system of the first embodiment according to the present invention. The protective-control measuring system shown in FIG. 1 includes two protective-control measuring devices 1 having the same configuration and connected together through a transmission path 2. The transmission path 2 is configured by various medium, such as an optical fiber, a microwave link, or a power line. Specific examples of transmission target data exchanged between the protective-control measuring devices 1 are electric-line current data measured between both terminals of an electric line, a breaker shut-off instruction, and various protective-control data like a device state in the substation. In the present specification, such transmission target protective-control data is referred to as "transmission target data" or "(transmission target) main data".

The protective-control measuring device 1 includes a target-data obtaining unit 11 that obtains the transmission target data, a key-data storage unit 12 that stores set number of key data set beforehand, an authentication-tag generator unit 13 that generates an authentication tag by using transmission target main data and key data, a transmitter/receiver unit 14 that sends/receives data, and a received-data authentication unit 15 that performs authentication on the received data.

In the present embodiment, an authentication-tag generating algorithm is used which uses a following key data usage scheme as a security scheme that is a feature of the present invention based on an information amount. That is, first, a scheme of changing key data 22 for each time is used when the authentication-tag generator unit 13 generates an authentication tag. In addition, use-time restriction is applied which makes the use of individual key data 22 unable beyond a set time (e.g., twice) set in advance during a pre-determined setting period like the operating period of the protective-control measuring device 1. That is, the "set time" in the use-time restriction is a "lower limit set time of prohibiting reuse of the key data", and when the set time is "twice", an "upper limit set time of reuse of the key data" is once.

In order to realize an authentication-tag generating algorithm through the security scheme based on the information amount, respective key-data storage units 12 of the two protective-control measuring devices 1 store respective key data sets including the same key data and the same number of such key data. The authentication-tag generator unit 13, the transmitter/receiver unit 14, and the received-data authentication unit 15 function as follows.

In addition to the function of generating an authentication tag 23 using the transmission target main data 21 and the key data 22, the authentication-tag generator unit 13 has a function of, when receiving main data 21a included in a received data 24a from the transmitter/receiver unit 14, generating an authentication tag 23b to be compared with an authentication tag 23a included in the received data 24a. The authentication tag 23b for comparison is generated by using the main data 21a in the received data 24a and the key data 22 stored in the key-data storage unit 12 in the local device.

The transmitter/receiver unit 14 has a function of adding the authentication tag 23 generated by the authentication-tag generator unit 13 to the main data 21 used for the generation thereof in order to generate transmission data 24, and of sending the transmission data 24 to the transmission path 2, and a function of receiving the data 24a from the transmission path 2, and of dividing the received data 24a into the main data 21a and the authentication tag 23a.

The received-data authentication unit 15 performs verification on the received data for a validity by using the main data 21a and the authentication tag 23a in the received data 24a received by the transmitter/receiver unit 14, and the key data 22 stored in the key-data storage unit 12 in the local device, and outputs a verification result. More specifically, the received-data authentication unit 15 compares the authentication tag 23a in the received data 24a with the authentication tag 23b for comparison generated by the authentication-tag generator unit 13 by using the main data 21a in the received data 24a and the key data 22 in the local device, determines whether or not those authentication tags 23a and 23b match with each other, and outputs a verification result 25.

In the present specification and accompanying drawings, a symbol "a" in reference numerals "21a", "23a", and "24a", which indicates main data, the authentication tag, and the received data at the reception side, is used in order to distinguish received data and data included therein (main data and authentication tag) at the reception side from those of the sending side. Moreover, a symbol "b" in the reference numeral "23b", which indicates the authentication tag for comparison generated by using the main data in the received data and the key data in the local device, is used in order to distinguish such a tag from the authentication tag "23a" in the received data "21a".

[Working and Effect]
[System Operation]

Figures 2, 3:
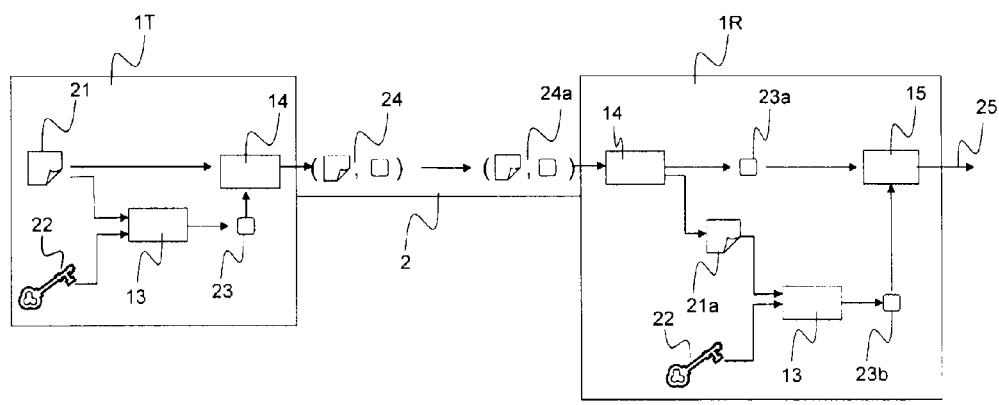
FIG. 2 is a diagram showing characteristic data processing and data flow in the protective-control measuring system shown in FIG. 1.
FIG. 3 is a diagram showing a format of transmission data sent between protective-control measuring devices shown in FIG. 1.

FIG. 2 is a diagram showing characteristic data processing and data flow when the transmission target main data 21 is sent from one protective-control measuring device 1 (hereinafter, referred to as a transmitter device 1T) to another protective-control measuring device 1 (hereinafter, referred to as a receiver device 1R) in the protective-control measuring system shown in FIG. 1. In respective accompanying drawings following to FIG. 2 in which the feature of a data processing and a data flow are shown, from the standpoint of simplification, only the units that execute the characteristic data processing in each embodiment are illustrated among the structural elements of each device 1.

As shown in FIG. 2, in the transmitter device 1T, when the transmission target main data 21 is input into the authentication-tag generator unit 13, the authentication-tag generator unit 13 reads a piece of key data 22 selected in accordance with a key usage order set beforehand, and generates the authentication tag 23 by using those main data 21 and key data 22. The generated authentication tag 23 and the main data 21 that is the origin of the tag are input into the transmitter/receiver unit 14. The transmitter/receiver unit 14 combines the input main data 21 and authentication tag 23 in order to generate the transmission data 24, and sends the transmission data 24 to the receiver device 1R through the transmission path 2.

Moreover, in the receiver device 1R, the transmitter/receiver unit 14 receives the data 24 sent from the transmitter device 1T as received data 24a. The transmitter/receiver unit 14 divides the received data 24a into the main data 21a and the authentication tag 23a, and inputs the main data 21a and the authentication tag 23a into the authentication-tag generator unit 13 and the received-data authentication unit 15, respectively. Upon inputting of the main data 21a in the received data 24a into the authentication-tag generator unit 13, the authentication-tag generator unit 13 reads key data 22 in the local device 1R selected in accordance with a key usage order set beforehand, generates the authentication tag 23b for comparison by using those received main data 21a and key data 22 in the local device, and inputs the generated authentication tag into the received-data authentication unit 15.

The received-data authentication unit 15 compares the authentication tag 23a in the input received data 24a with the authentication tag 23b for comparison, and determines whether or not those authentication tags 23a and 23b match with each other, and outputs a verification result 25.

FIG. 3 is a diagram showing a format of the transmission data 24 sent between the devices. As shown in FIG. 3, the transmission data 24 includes a header and a footer that are a physical layer and a data link layer, and main data and an authentication tag added between the header and the footer as an application layer.

[Authentication-Tag Generating Algorithm]

In the present embodiment, the authentication-tag generating algorithm employing a security scheme on the basis of an information amount is an important feature of the present invention. In particular, application of the use-time restriction where the individual key data 22 is not used equal to or more than the set time within a set period is important in order to retain the data size of the key within a practical range.

Hereinafter, from the standpoint of clarifying the working and effect of the authentication-tag generating algorithm employing such a security scheme, an explanation will be successively given of an authentication-tag generating process using a specific key data table shown in FIG. 4.

Figure 4:
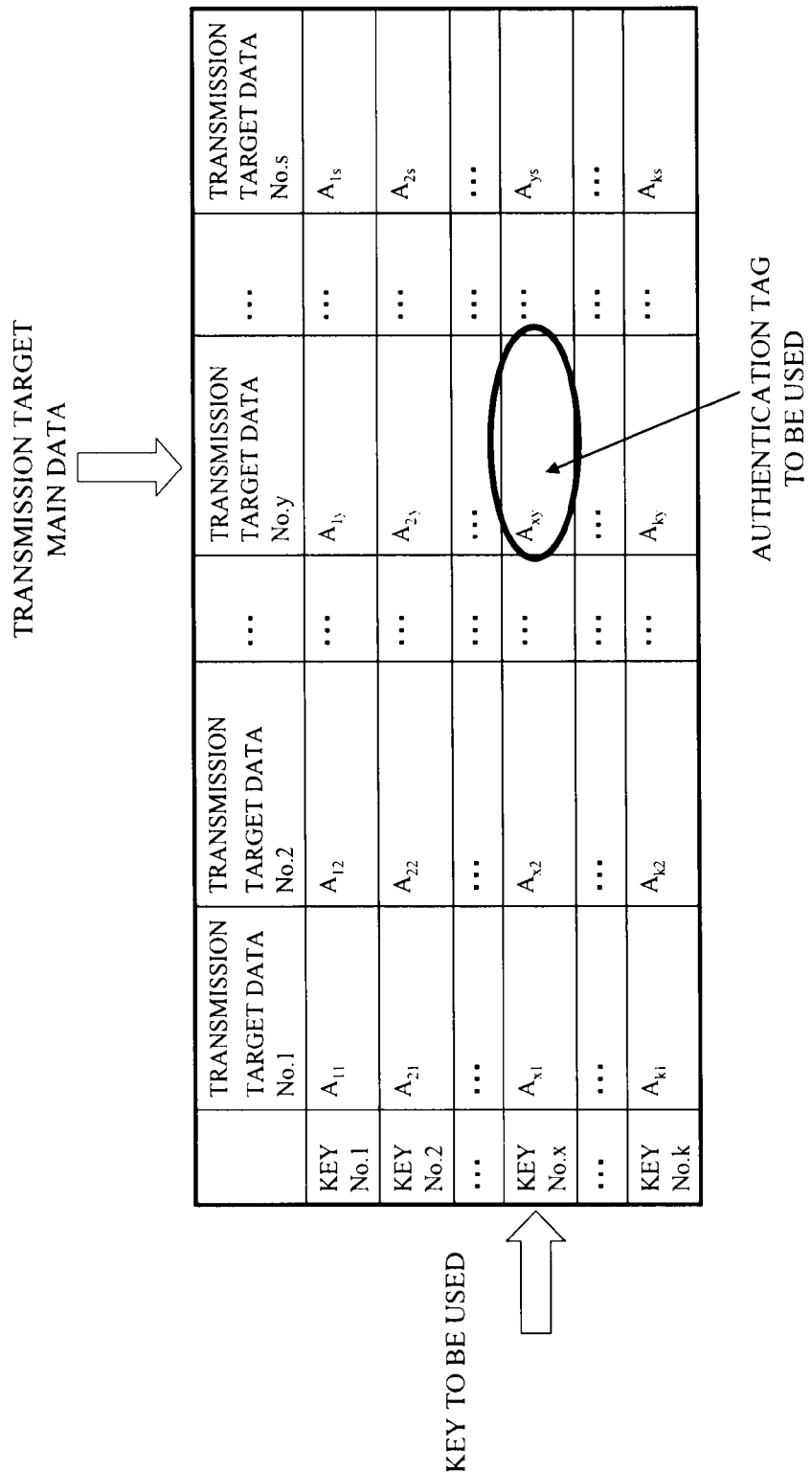
FIG. 4 is a diagram showing a specific key data table used by the protective-control measuring system shown in FIG. 1.

The key data table shown in FIG. 4 has k number of key data "No. 1" to "No. k" prepared for "s" number of transmission target data "No. 1" to "No. s" at maximum which are the transmission target main data. It is presumed that the use-time restriction of the key data in the key data table prohibits the use of the key equal to or more than a set time "twice" within a set period of "20 years" after the protective-control measuring device is activated for operation. In other words, the use-time restriction has contents such that "the lower limit set time of prohibiting reuse of the key data is twice and the upper limit set time of allowing reuse of the key data is once".

In order to fully ensure the use-time restriction, it is necessary to obtain the set number k of the key data prepared beforehand. The set number k of the key data prepared can be easily set based on the "total number of transmission data" sent during the set period within an operation cycle, i.e., the "total sending time of transmission data". For example, in the case of data exchange between terminals of a protection relay device, when current information of a local terminal is subject to sampling at a frequency of 600 Hz (electric angle: 30 degrees for 50-Hz system) and sent to a destination terminal at 600 Hz, the total sending time of transmission data during a set period of "20 years" can be obtained from a following formula (1).

$$600 \times 60 \times 60 \times 24 \times 365 \times 20 = 3.8 \times 10^{11} \quad (1)$$

In this case, by setting the number k of the key data prepared to be larger than the total sending time, it is possible to generate authentication tags sequentially using respective pieces of key data in the key data table shown in FIG. 4 while ensuring the above-explained use-time restriction such that "the lower limit set time of prohibiting reuse of key data is twice and the upper limit set time of allowing reuse of the key data is once".

More specifically, at a time point of starting operation of the protective-control measuring devices, for example, authentication tags are generated sequentially by using respective pieces of key data in an ascending order with the key data "No. 1" having the smallest number being as a start, and respective authentication tags generated are added to respective transmission target data, and are sequentially sent to a transmission destination device in the format shown in FIG. 3.

The maximum number "s" of the transmission target data shown in FIG. 4 is a possible total number of transmission target data, and when, for example, the data length of the transmission target data is 32 bits, s becomes $2^{32}$. Moreover, when a possible total number of authentication tags is m, the authentication tag can be expressed by $2^{log\ m}$ bits. For example, upon sending a given transmission target data No. y, if the key data used is No. x, an element $A_{xy}$ of the authentication matrix of the key data table is added as the authentication tag to the transmission target data No. y.

In the above-explained case, the authentication-tag generator unit 13 possibly generates m kinds of authentication tags at maximum, and in order to do so, different key data "No. 1" to "No. k" are sequentially used for each sampling during the set period of "20 years".

When the authentication-tag generating algorithm that generates m kinds of authentication tags at maximum is applied, It is presumed a case where a malicious third person (hereinafter, referred to as an attacker (opponent)) attempts to generate and send falsified data without spying on the data of such an algorithm at all, or the attacker spies on the data thereof over the transmission path and attempts to generate and send falsified data. In this case, Non-patent Literature 2 discloses that the probability of the receiver device falsely recognizing such falsified data as valid data is 1/m.

Therefore, according to the authentication-tag generating algorithm of the present embodiment which is different from the computational-complexity-based authentication scheme generally used in the IT industry and which uses a different key for each data transmission in order to generate m kinds of authentication tags at maximum, the probability that a falsified authentication tag is generated by an attacker who specified such a key accidentally and the falsified tag matches a correct authentication tag is also 1/m.

According to the computational-complexity-based authentication scheme, once the key is known by the attacker through a fast-speed computer, complete impersonation or substitution is possible for the attacker thereafter. According to the authentication-tag generating algorithm of the present embodiment, however, since the probability that a falsified authentication tag matches a correct authentication tag is 1/m for 20 years, by setting m to be a large value, the action from the attacker can be blocked in a level which is not a problem in practical use.

When, for example, $m=2^{32}$, the probability that the attacker successfully generates a falsified authentication tag is substantially $10^{-9}$, and this is sufficiently small in comparison with $10^{-5}$ to $10^{-7}$ which are in an error-rate range of a transmission path like a microwave link or an optical fiber generally used for the protective-control measuring device and is in an ignorable range.

Figure 5:
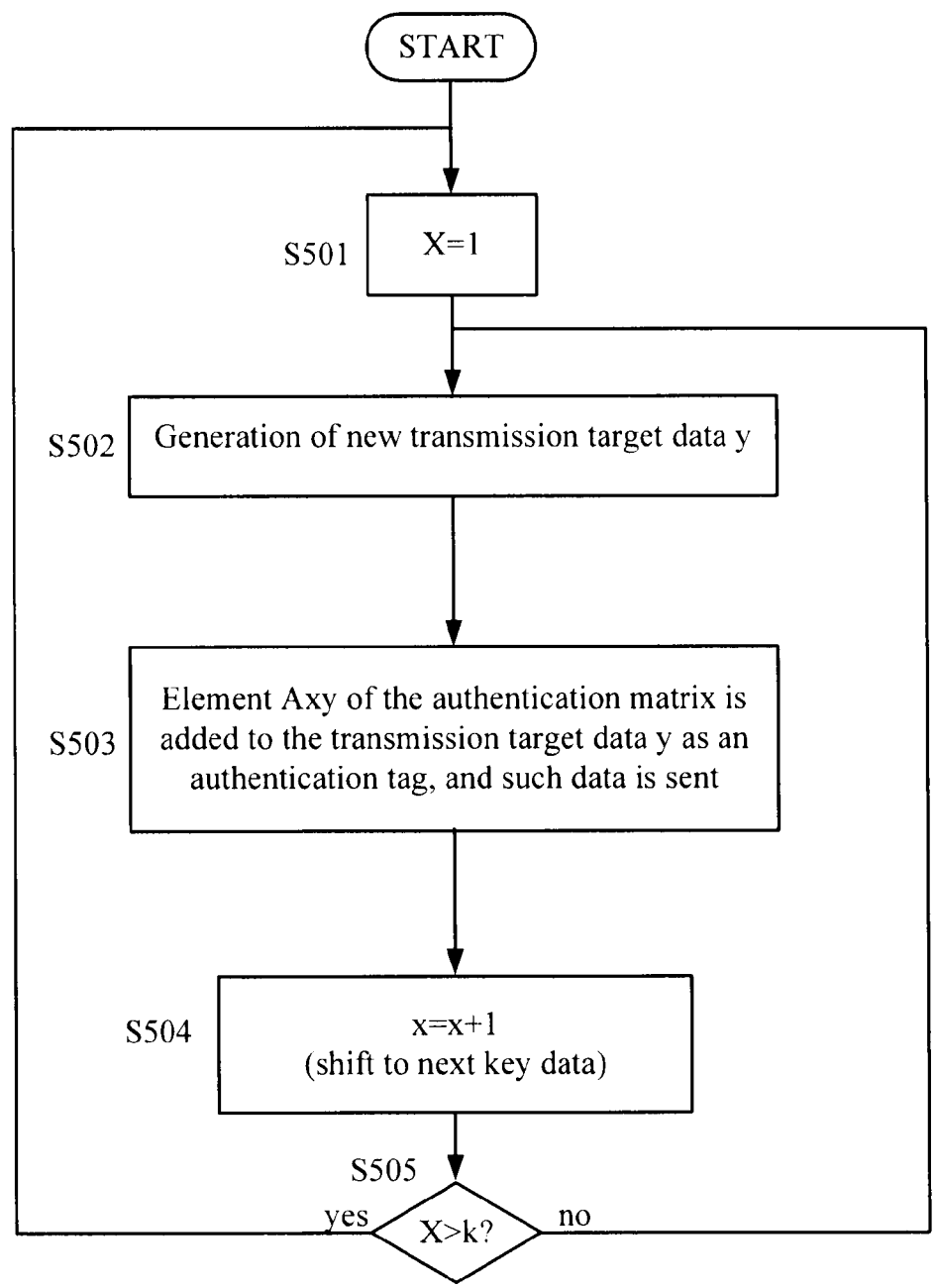
FIG. 5 is a flowchart showing an authentication-tag generating process by an authentication-tag generator unit shown in FIG. 1.

FIG. 5 is a flowchart showing the authentication-tag generating process by the authentication-tag generator unit 13. As shown in FIG. 5, with the key data number x being set as x=1 at first (step S501), every time new transmission target data y is generated (step S502), key data "No. x" with a number x is selected, and the element $A_{xy}$ of the authentication matrix of the key data table is added to the transmission target data y as an authentication tag, and such data is sent (step S503).

Every time when the transmission target data is sent, the key data number x to be used is incremented one by one, and is shifted to next key data "No. x+1" (step S504). Next, after successive processes (steps S502 to S504) of increasing the key data number one by one every time when new transmission target data is sent are repeated, and when the key data number reaches the maximum key data number "No. k" at last "step S505: YES", the key data number x is returned to be x=1 (step S501), and successive processes (steps S502 to S504) are continued.

When such an authentication-tag generating process is executed, the specific number of key data prepared beforehand can be easily set by dividing the "total sending time of transmission data during the set period" by the "upper limit set time of allowing reuse of the key data" based on the use-time restriction. That is, when the "upper limit set time of allowing reuse of the key data is once", the "total sending time of transmission data during the set period" is divided by "1", so that the specific number of key data can be equal to or greater than the "total sending time". Moreover, when the "upper limit set time of allowing reuse of the key data is twice", the "total sending time of transmission data during the set period" is divided by "2", so that the specific number of key data can be equal to or greater than double as much as the "total sending time".

[Effect]

According to the above-explained first embodiment, following effects can be obtained. First, data that is a combination of the transmission target main data and an authentication tag generated therefrom is sent, and a receiver side compares an authentication tag generated based on the main data in the received data with the authentication tag in the received data, thereby detecting presence/absence of data substitution over the transmission path. By changing the key data used for generating an authentication tag every time data is sent, the security can be ensured not by computational complexity but by information amount (entropy).

Moreover, by employing use-time restriction that prohibits the use of the same key data equal to or greater than a set time within a set period, the operation cycle derived from the lifetime of the protective-control measuring device can be taken as a set period, and the set time can be a small number, thereby making the occurrence probability of substitution and impersonation extremely small during the operation cycle. In particular, by setting a set period that is a restriction in time, the key data size can be retained within a range realizable over the operation of the protective-control measuring device without infinitely increasing the key data size.

Hence, according to the first embodiment, it is possible to establish a practical information-theoretic security technology which retains the key data size within a range realizable in practice, and which can be easily applied to protective-control measurement, and to provide highly secure and reliable protective-control measuring systems and devices and data transmission methods using such an information-theoretic security technology.

Second to Seventh Embodiments

Protective-control measuring systems according to the second to the seventh embodiments to be discussed later are all the protective-control measuring systems (see FIG. 1) having the same system configuration as that of the first embodiment. The second to the fifth embodiments are modified examples in which a process and data structure are partially changed or further unit is added, and the sixth and the seventh embodiments are application examples to a current-differential protection system and a substation control system. Accordingly, in the explanation for the second to the seventh embodiments below, only the features different from the first embodiment will be explained and the explanation for the same structural element as that of the first embodiment will be basically omitted.

Second Embodiment

In the above-explained first embodiment, the key data table and the authentication matrix shown in FIG. 4 are used as the key data. In the second embodiment, the key data is further divided into a fixed key matrix U commonly used and a disposable key vector v changed for each sending, so that the size of the authentication tag and that of the key data are reduced, and thus the authentication-tag generating calculation amount is reduced.

As a result of dividing the key data into the fixed key matrix U and the disposable key vector v, the authentication-tag generating algorithm by the authentication-tag generator unit 13 (see FIG. 1) obtains an authentication tag vector y through a following vector calculation.

$$y=xU+v$$

where
x is main data vector;
U is a fixed key matrix; and
v is a disposable key vector.

Figure 6:
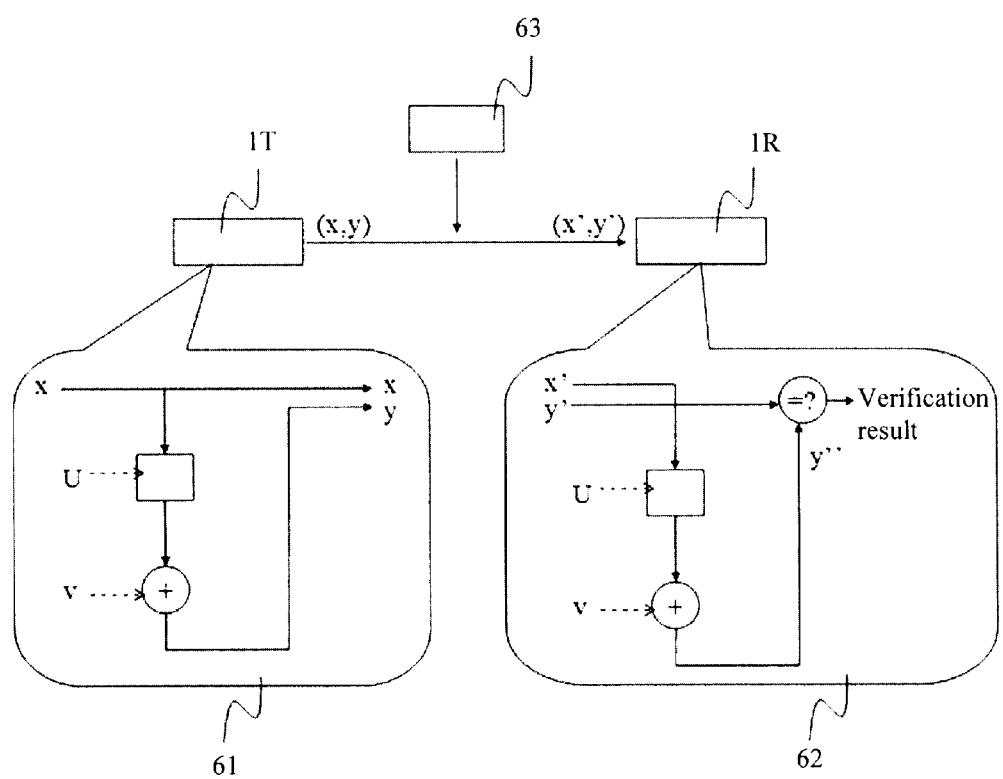
FIG. 6 is a diagram showing characteristic authentication-tag generating algorithm and authentication algorithm in a protective-control measuring system of a second embodiment according to the present invention.

FIG. 6 is a diagram showing characteristic authentication-tag generating algorithm and authentication algorithm in the transmitter device 1T and the receiver device 1R according to the second embodiment using such authentication-tag generating algorithm.

As shown in FIG. 6, in the transmitter device 1T, the authentication tag vector y is generated from the main data vector x by using the fixed key matrix U and the disposable key vector v through the above-explained authentication-tag generating algorithm 61, and is sent as transmission data (x, y).

Moreover, in the receiver device 1R, when receiving the received data (x', y'), an authentication tag vector y" is generated from the main data vector x' using the fixed key matrix U in the local device and the disposable key vector v through the authentication algorithm 62, and verification is carried out based on a comparison with the authentication tag vector y' in the received data (x', y').

According to the second embodiment as such, by dividing the key data into the fixed key matrix U and the disposable key vector v, a large authentication tag space having substantially same size as that of the authentication tag space realized by the first embodiment only through an operation of the disposable key vector v can be generated, so that substantially same security and reliability as those of the first embodiment against an attacker can be secured. Moreover, the key data needed to be changed for each data transmission is only the disposable key vector v, and in other words, the key data can be configured by a fixed key matrix U and necessary number of disposable key vectors v depending on the sending time, so that the key data amount to be stored in the protective-control measuring device 1 beforehand can be reduced.

Figures 7, 8:
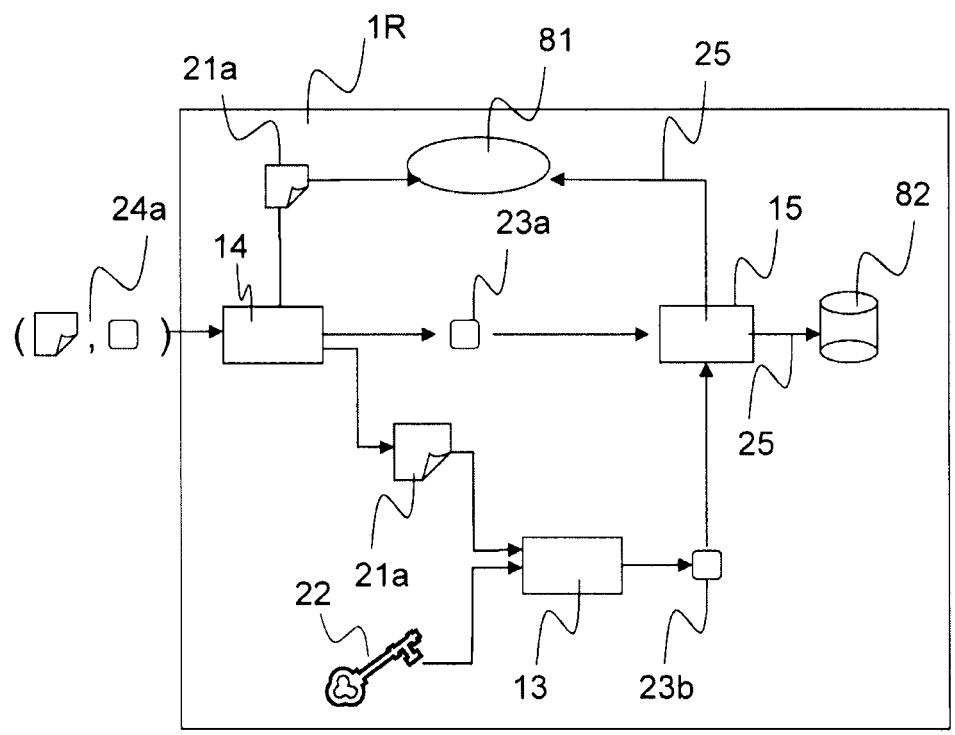
FIG. 7 is an equation showing a specific example of a calculation by the authentication-tag generating algorithm shown in FIG. 6.
FIG. 8 is a diagram showing characteristic data processing and data flow of a receiver device in a protective-control measuring system of the third embodiment according to the present invention.

FIG. 7 shows a specific example of a calculation through the authentication-tag generating algorithm according to the present embodiment. In the case of the example shown in FIG. 7, the fixed key matrix U is fixedly given beforehand, and when a disposable key vector v is (0, 1, 0) at a timing of sending main data x (1, 0, 0, 1, 0), an authentication tag vector y (1, 1, 0) is generated as shown in the figure. At the receiver side, the same calculation is executed on the received data in order to calculate an authentication tag vector, and is compared with the authentication tag vector added to the received data.

According to the above-explained second embodiment, the same effect as that of the first embodiment can be obtained, and the size of the authentication tag and that of the key data can be reduced, thereby reducing the authentication-tag generating calculation amount. In particular, the authentication-tag generating algorithm of the present embodiment can obtain an authentication tag vector by acquiring logical addition of a bit sequence and logical multiplication thereof, so that high-speed calculation is enabled, and thus such an authentication-tag generating algorithm is appropriate for an application to real-time systems and embedded systems like protective-control measuring devices.

Moreover, the whole size of the key data necessary for the set period of "20 years" can be obtained from a following calculation, and is substantially 1.5 terabytes. This value was a large value to be set in a protective-control measuring device in the year of 2008, but in accordance with a remarkable development circumstance of memory products in which increasing of the memory capacity drastically advances, it is becoming a value that can be easily set in the device.

Sending rate: 600 Hz
Transmission data length: 2047 bits
Operation cycle: 20 years
Bit number of authentication tag: 32 bits (substitution success probability: $1/2^{32}=10^{-9}$)

$$\begin{aligned}
\text{Necessary key size} &= (\text{size of } U + \text{size of } v) \\
&= 32 \text{ bits} \times 2047 \text{ bit} + 32 \times \\
&\quad (\text{sending time within 20 years}) \\
&= 32 \times (2047 + 600 \times 60 \times 60 \times 24 \times 365 \times 20) \\
&= 4 \text{ Bytes} \times 3.8 \times 10^{11} \\
&= 1.5 \ T \text{ Bytes}
\end{aligned}$$

Third Embodiment

According to the above-explained first embodiment, the explanation was given of a case in which the received-data authentication unit 15 in the receiver device 1R outputs a verification result 25 for authentication. In practice, however, the receiver device 1R generally has an application that executes protective-control calculation by using the main data 21a in the received data 24a.

The third embodiment has a feature in a data processing by the receiver device in order to suppress the use of fraudulent data through such an application, and FIG. 8 is a diagram showing characteristic data processing and data flow by such a receiver device 1R.

As shown in FIG. 8, according to the third embodiment, not only main data 21a in the received data 24a but also the verification result 25 by the received-data authentication unit 15 are given to an application 81, so that the application 81 is configured to discard the received data 24a when the received data 24a is fraudulent. Moreover, the verification result 25 is stored in a security information log unit 82.

Figure 9:
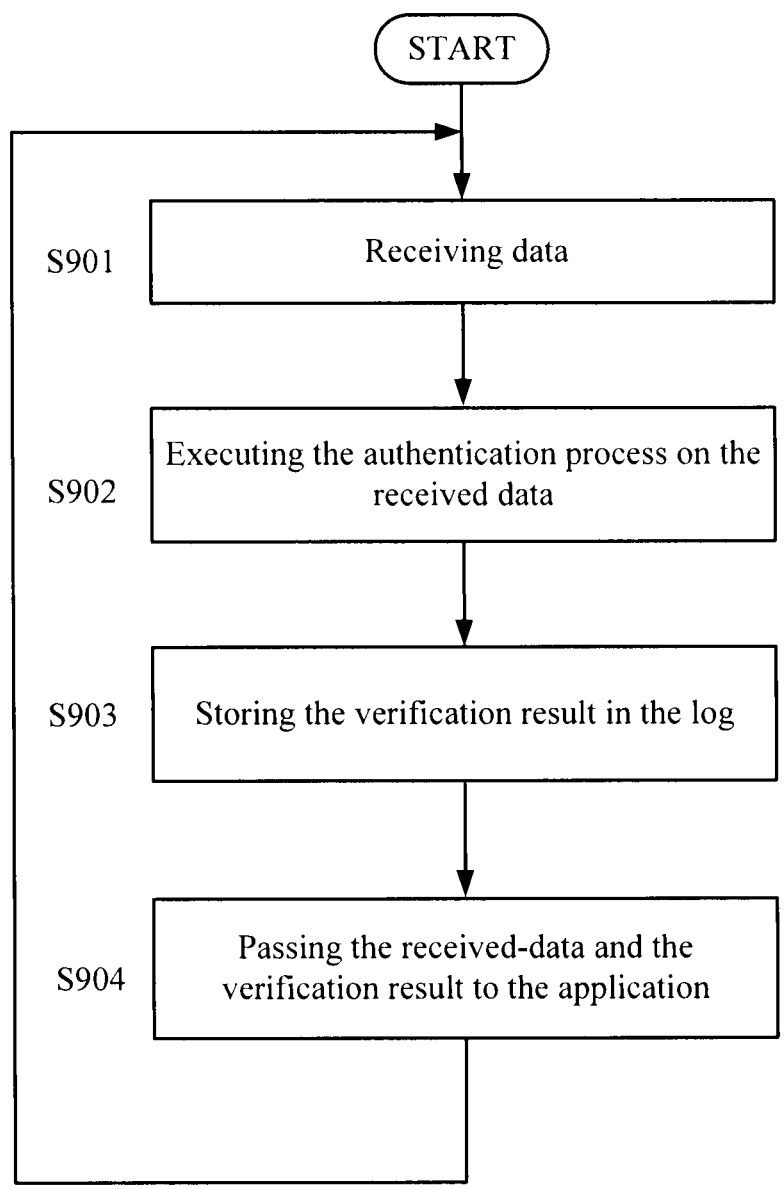
FIG. 9 is a flowchart showing a characteristic data processing by a transmitter/receiver unit and a received-data authentication unit in the receiver device shown in FIG. 8.

FIG. 9 is a flowchart showing a characteristic data processing by the transmitter/receiver unit 14 and the received-data authentication unit 15 in the receiver device 1R according to the third embodiment having a feature in handling of the verification result 25 by the received-data authentication unit 15.

That is, when the transmitter/receiver unit 14 in the receiver device 1R receives data (step S901), the received-data authentication unit 15 executes an authentication process on the received data 24a (step S902), and the verification result 25 is stored in the security information log unit 82 as a security information log (step S903). The transmitter/receiver unit 14 passes the main data 21a to the application 81 and the received-data authentication unit 15 passes the verification result 25 thereto (step S904).

In FIG. 8, a data flow indicating that the transmitter/receiver unit 14 passes the main data 21a to the application 81 is shown, but the received-data authentication unit 15 may pass both verification result 25 and main data 21a thereto. In any case, by passing both main data 21a and verification result 25 to the application 81, the application 81 becomes able to discard main data contained in fraudulent data.

According to the above-explained third embodiment, the same effect as that of the first embodiment can be obtained, and in addition, any use of fraudulent data for a protective-control calculation can be suppressed, so that the reliability of the protective-control measuring device improves. Moreover, a verification result at the time of reception of fraudulent data is stored as a security information log, so that it becomes possible to analyze how an attacker attacks by using the saved log. Therefore, various effective countermeasures, such as of increasing the size of an authentication tag or of monitoring the transmission path, can be carried out in order to make the authentication-tag generating algorithm further robust.

Fourth Embodiment

According to the fourth embodiment, in order to make the key data used between the transmitter device 1T and the receiver device 1R consistent, key identification information for uniquely identifying individual key data is added to the key data information stored in the key-data storage unit 12 (see FIG. 1).

Figure 10:
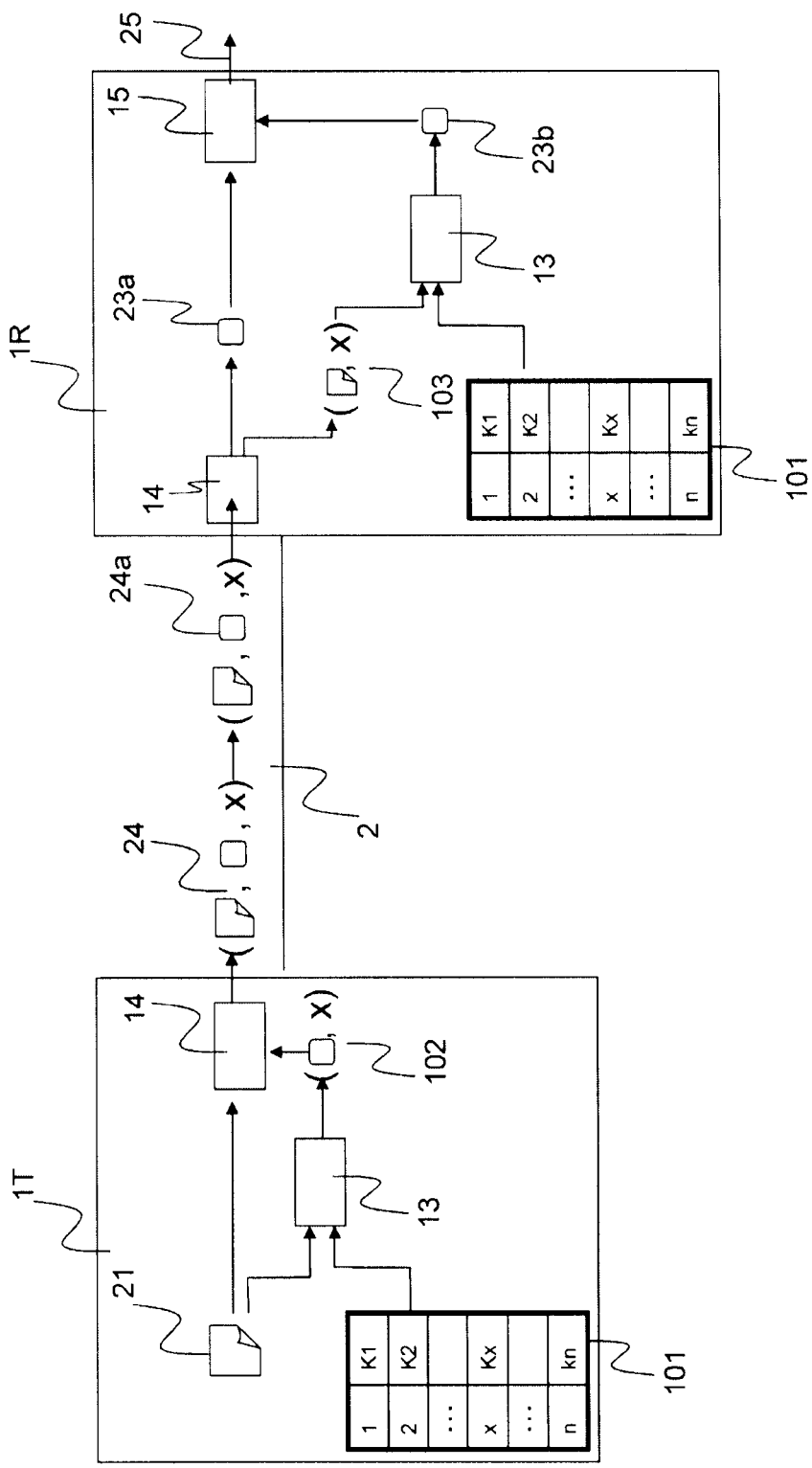
FIG. 10 is a diagram showing characteristic data processing and data flow by a protective-control measuring system of the fourth embodiment according to the present invention.

FIG. 10 is a diagram showing characteristic data processing and data flow according to the fourth embodiment. The transmitter device 1T and the receiver device 1R have a same key data information table 101 which includes a plurality of key data and a plurality of key identification information each uniquely identifying each key data. According to the example shown in FIG. 10, as an example of the key identification information, sequence numbers "1, 2, . . . , n" are added to n number of key data K1 to Kn, respectively. When such a key data information table 101 is used, the transmitter device 1T and the receiver device 1R generate data including a sequence number x for identifying a key.

That is, in the transmitter device 1T, the authentication-tag generator unit 13 passes a data set 102 including the authentication tag 23 generated from the main data 21 and the sequence number x for identifying the key data 22 used to the transmitter/receiver unit 14 when generating the authentication tag 23 from the main data 21 and the key data 22 with the sequence number x. As a result, the sent data 24 generated by the transmitter/receiver unit 14 includes the main data 21, the authentication tag 23, and the key sequence number x.

Moreover, in the receiver device 1R, the transmitter/receiver unit 14 divides the received data 24a into a data set 103 including the main data 21a and the key sequence number x and the authentication tag 23a, and passes the data set 103 to the authentication-tag generator unit 13. The authentication-tag generator unit 13 identifies the key data 22 with the same sequence number x from the key data information table 101 in the local device based on the given sequence number x, and generates the authentication tag 23b for comparison by using the key data 22 with the sequence number x and the main data 21a in the received data.

Accordingly, an authentication process using the same key data between the transmitter device 1T and the receiver device 1R is realized.

As explained above, according to the authentication scheme of the first embodiment, since the use-time restriction of restricting the use time of the same key data during the set period is employed, when it is divided in short times and observed, always different key data is used in order to generate an authentication tag. Hence, a structure is necessary which makes the key data used at the transmitter and receiver sides always consistent.

In contrast, according to the above-explained fourth embodiment, by using a sequence number that identifies key data, the key data used at the transmitter side and the receiver side can be surely made consistent. For example, when, by any possibility, either one of the protective-control measuring devices breaks down, the transmission path is temporarily disconnected, the system is restored and then transmission is restarted, according to the present embodiment, by searching the sequence number from the key data information table 101 at the receiver side, the same key data as that of the transmitter side can be easily and surely used at the receiver side. Moreover, when operation of the protective-control measuring devices is initiated between both terminals, according to the present embodiment, the key data used in both terminals is automatically synchronized, so that a highly reliable and operable protective-control measuring system can be provided.

Fifth Embodiment

As explained above, according to the authentication scheme of the first or second embodiment, the probability that fraudulent received data is falsely determined as valid data can be expressly set depending on the contents of the key data used or the authentication-tag generating algorithm using such a key data.

Hence, according to the fifth embodiment, the authentication-tag generator unit 13 shown in FIG. 1 is provided with a function of allowing a user to set the contents of the key data usable and the authentication-tag generating algorithm. According to such a configuration, the probability that the fraudulent received data is falsely determined as valid data can be easily set to be lower than, for example, the error rate of the transmission path.

The security systems for the protective-control measuring system proposed so far are mainly applied in the IT industry, and a protective-control engineer is unable to control the algorithm and the detection rate. According to the fifth embodiment in which the authentication-tag generator unit 13 is provided with a setting function, however, the protective-control engineer can easily control the algorithm and the detection rate of substitution and impersonation uniquely set based on such an algorithm.

As the specific set values in this case, like the relay setting operation, for example, parameters, such as U, V, probability P, . . .

are sequentially set. For example, when the error rate of the transmission path is $10^{-5}$, if various parameters are set and input such that it becomes equal to or greater than $10^{-6}$, any attack by an attacker can be blocked in a level substantially ignorable in practice.

Together with the advancement of technology, even if the communication infrastructure for protective-control measurement changes in the future, according to the present embodiment, a protective-control measuring system that is secure from the standpoint of information logic can be operated regardless of the change in the communication infrastructure, and a change of a security software after the device is delivered becomes unnecessary without an incompatibility with the increase of the process ability of computers. Accordingly, a protective-control measuring system with high economic efficiency, reliability, and operation availability can be provided.

Sixth Embodiment

Figure 11:
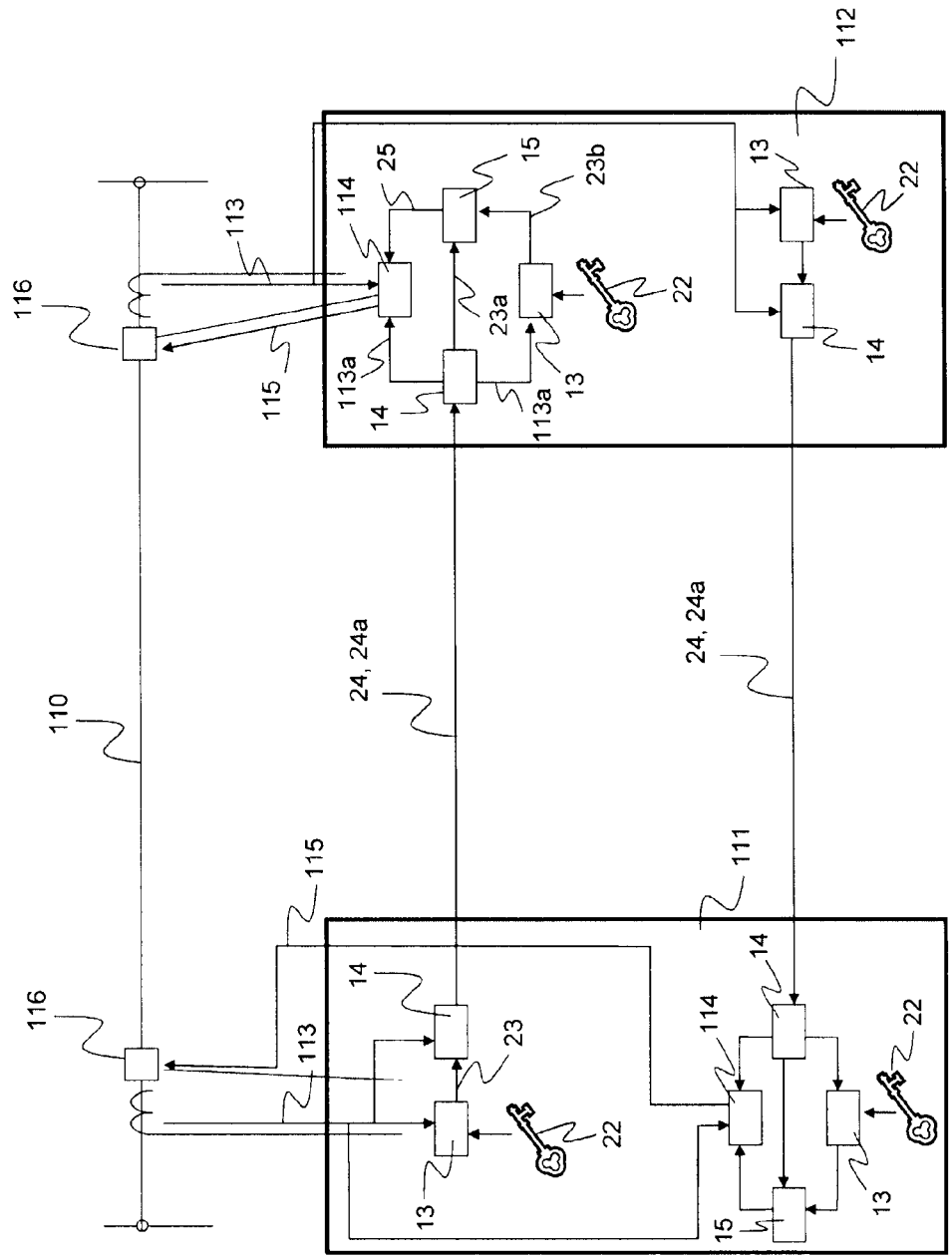
FIG. 11 is a diagram showing characteristic data processing and data flow by a current-differential protection system of the sixth embodiment according to the present invention.

FIG. 11 shows a protective-control measuring system of the sixth embodiment according to the present invention, and is a diagram showing characteristic data processing and data flow when, in particular, the protective-control measuring system of the first embodiment is applied to a current-differential protection system.

As shown in FIG. 11, the current-differential protection system is a system which has protection relay devices 111 and 112 installed at both ends of an electric line 110, and which mutually sends transmission target data that is current/voltage data 113 of a local terminal between those protection relay devices 111 and 112, thereby protecting the electric line based on the Kirchhoff's law.

In order to protect the electric line, the protection relay devices 111 and 112 each include a current-differential calculation unit 114 which performs current-differential calculation using the current/voltage data 113 at the local terminal and current/voltage data 113a at the other terminal. When a trouble is detected, the current-differential calculation unit 114 outputs a trip instruction 115 in order to trip a breaker 116 at the local terminal. An explanation will be given of a case in which another protection relay device 112 receives the current/voltage data 113 of the one protection relay device 111 and performs current-differential calculation in such a current-differential protection system.

The protection relay device 111 obtains the current/voltage data 113 at the local terminal of the electric line 110 through the target-data obtaining unit 11 (see FIG. 1). The current/voltage data 113 and the key data 22 are input into the authentication-tag generator unit 13 in order to generate the authentication tag 23. The authentication tag 23 and the current/voltage data 113 are given to the transmitter/receiver unit 14, and the transmitter/receiver unit 14 sends the transmission data 24 that is a combination of the current/voltage data 113 and the authentication tag 23 to the protection relay device 112 at the other terminal.

When receiving data from the protection relay device 111 at the other terminal through the transmitter/receiver unit 14 as the received data 24a, the protection relay device 112 passes the current/voltage data 113a of the protection relay device 111 at the other terminal included in the received data 24a to the current-differential calculation unit 114. At the same time, the same current/voltage data 113a and the key data 22 are input into the authentication-tag generator unit 13 which generates the authentication tag 23b for comparison.

The generated authentication tag 23b for comparison and the authentication tag 23a in the received data 24a are input into the received-data authentication unit 15, and the received-data authentication unit 15 performs authentication verification on whether or not those two authentication tags 23a and 23b match with each other, and passes the verification result 25 to the current-differential calculation unit 114. The current/voltage data 113 at the local terminal obtained by the target-data obtaining unit 11 (see FIG. 1) is also passed into the current-differential calculation unit 114.

The current-differential calculation unit 114 performs current-differential calculation by using the current/voltage data 113 of the local terminal and the current/voltage data 113a of the other terminal, and when detecting a system trouble of the electric line 110, outputs the trip instruction 115 to the breaker 116 at the local terminal.

In the case of the current-differential relay system, the process in the reverse direction (a process in which the protection relay device 112 sends the current/voltage data 113 of the local terminal to the protection relay device 111, and the protection relay device 111 performs current-differential calculation, and when detecting a system trouble, trips the breaker 116 at the local terminal of the protection relay device 111) is simultaneously executed.

Figure 12:
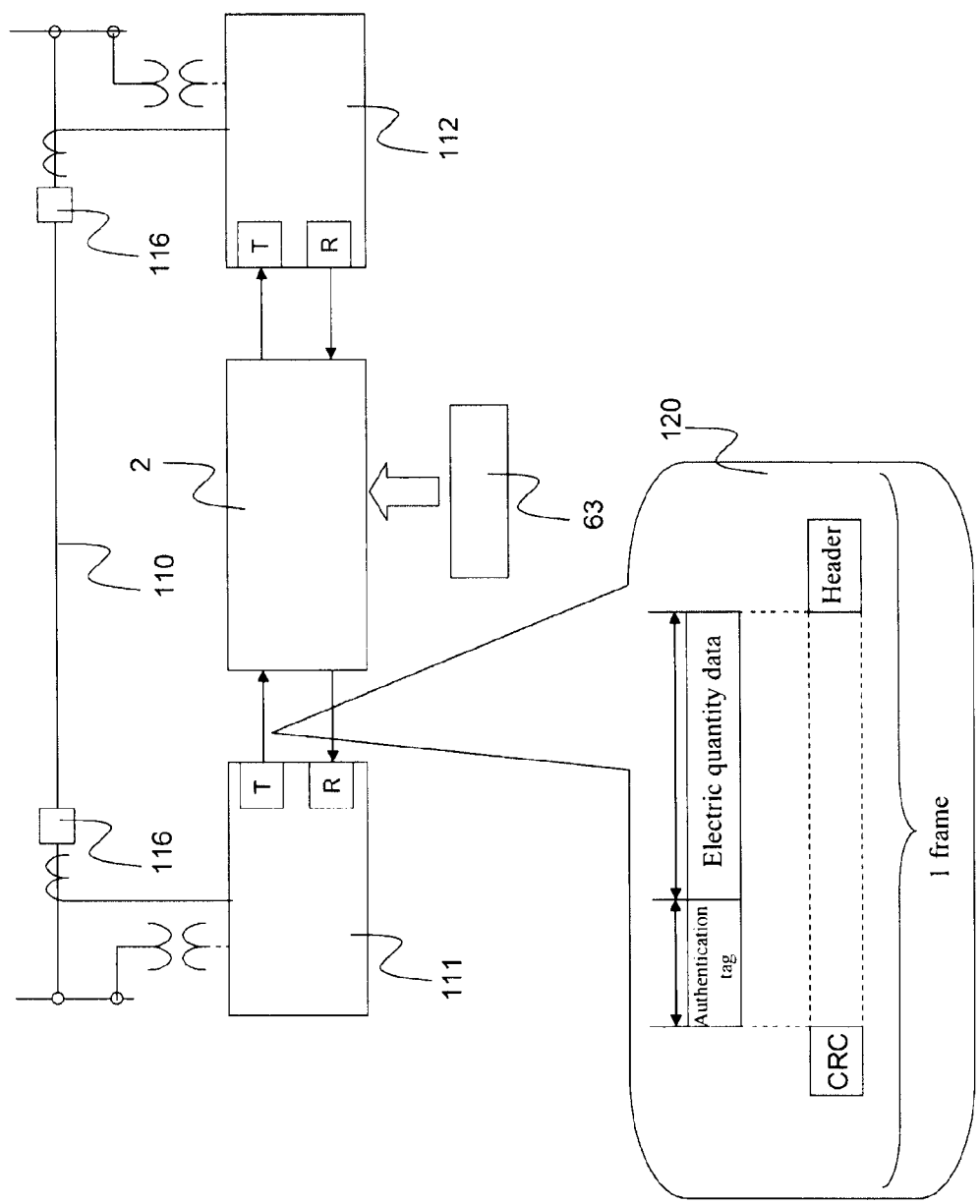
FIG. 12 is a diagram showing a specific image of the current-differential protection system shown in FIG. 11.

FIG. 12 shows a specific image when the present invention is applied to an actual current-differential relay system. The protection system is realized by relays that mutually send electric quantity data at respective local terminals. A format 120 indicated by a balloon indicates that a transmission data frame is configured by a header, electric quantity data, an authentication tag, and CRC (Cyclic Redundancy Check) in the case of a general-purpose communication network like Ethernet (registered trademark). In the case of Ethernet, the maximum length per frame is 1514 bytes, so that when the size of the authentication tag is 32 bits, the ratio of the size of the authentication tag which is 32 bits (an attack success probability is $10^{-9}$) in the whole frame is very small, and it is apparent that addition of an authentication tag hardly affects the communication traffic.

According to the above-explained sixth embodiment, an effective security countermeasure can be applied to protection relays which mutually exchange protective-control data through a communication path like electric-line current-differential protection relays.

Modified Example of Sixth Embodiment

Figure 13:
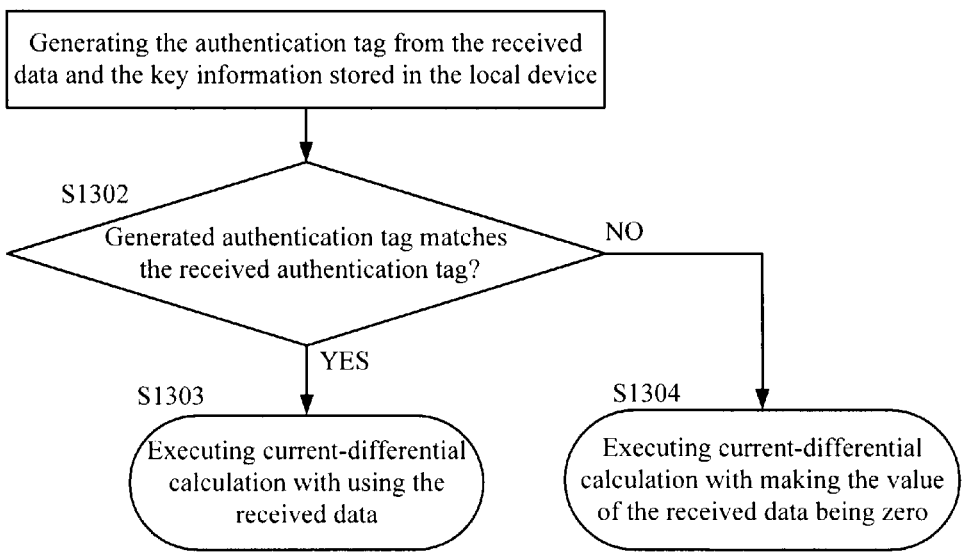
FIG. 13 is a flowchart showing a characteristic data processing in a modified example of the sixth embodiment shown in FIG. 11.

FIG. 13 is a flowchart showing a process of executing current-differential calculation with the current/voltage data at the other terminal being zero when the verification result 25 indicates "mismatch of authentication tags" (fraudulent data) in the current-differential protection system according to the sixth embodiment shown in FIG. 11. Only when the verification result 25 indicates "match of authentication tags" (valid data), current-differential calculation is executed using the received current/voltage data at the other terminal. It is possible through such a process to suppress any use of fraudulent data for current-differential calculation, so that a current-differential protection system with better reliability can be provided.

Figure 14:
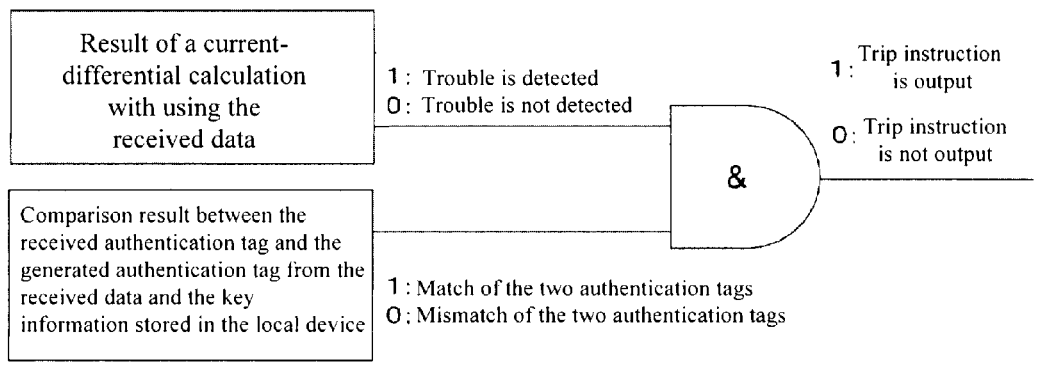
FIG. 14 is a logic circuit diagram showing a characteristic data processing in a modified example of the sixth embodiment shown in FIG. 11.

FIG. 14 is a logic circuit diagram showing a process of locking a trip instruction to the breaker 116 regardless of a result of current-differential calculation when the verification result 25 indicates "mismatch of authentication tags" in the current-differential protection system of the sixth embodiment shown in FIG. 11.

In the case of a normal relay, a result of a current-differential calculation is directly output to the breaker 116 as a trip instruction, but in the case of the example shown in FIG. 14, a result of the current-differential calculation and the verification result 25 for authentication are subjected to an AND operation, and a result thereof is output to the breaker 116, so that only when the verification result 25 indicates "mismatch of authentication tags", no trip instruction is given to the breaker 116. According to such a process, the breaker can be prevented from being tripped based on fraudulent data, and thus a current-differential protection system with a better reliability can be provided.

Seventh Embodiment

Figure 15:
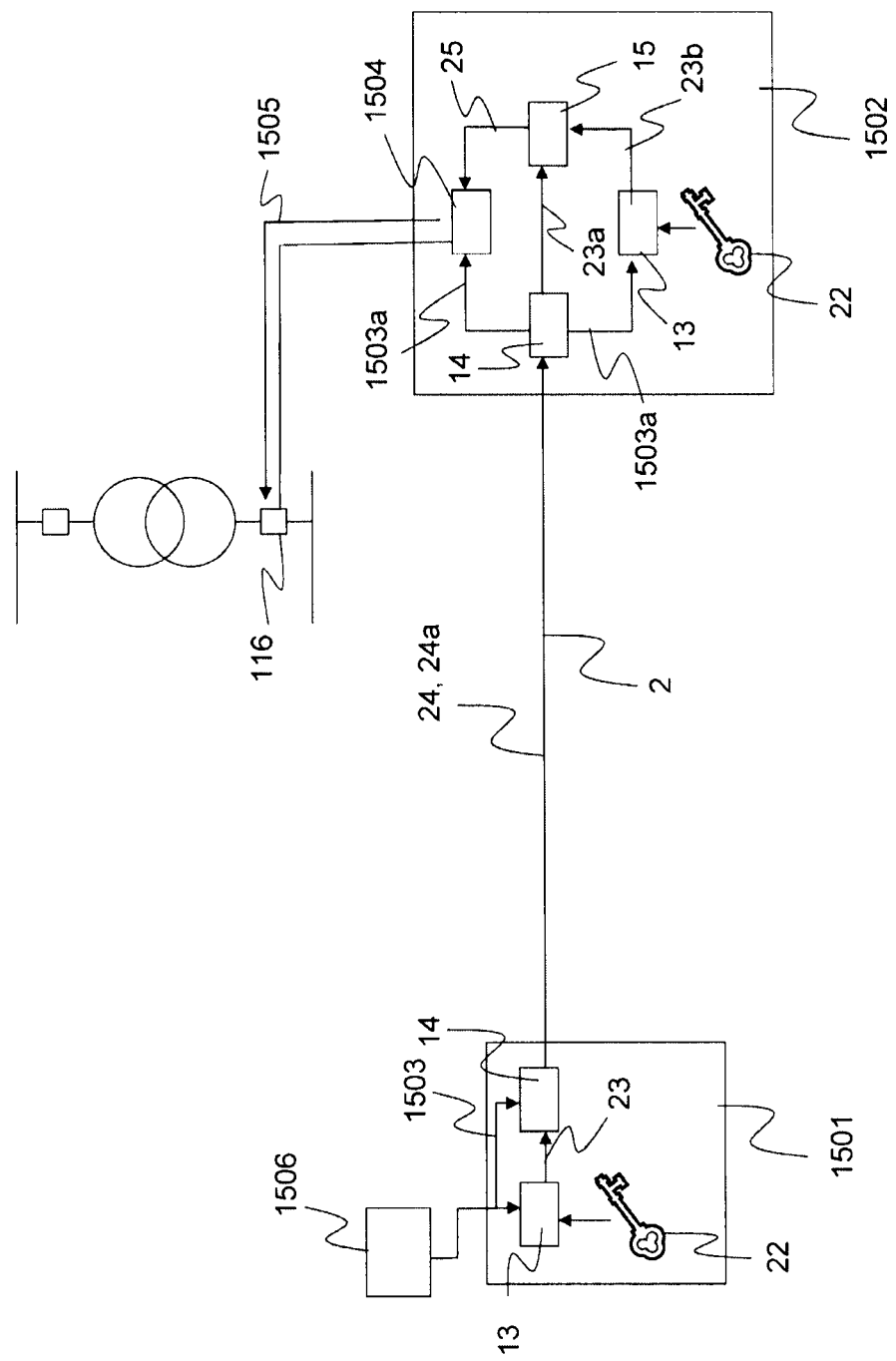
FIG. 15 is a diagram showing characteristic data processing and data flow by a substation control system of the seventh embodiment according to the present invention.

FIG. 15 shows a protective-control measuring system of the seventh embodiment according to the present invention, and is a diagram showing characteristic data processing and data flow when, in particular, the protective-control measuring system of the first embodiment is applied to a substation control system.

As shown in FIG. 15, a substation control system is a system that causes a control computer 1501 outside a substation to transmit a control instruction 1503 to a control device 1502 installed in the substation, thereby controlling power equipment under the control of the control device 1502.

FIG. 15 shows, as an example, a system which causes a control-instruction outputting unit 1504 of the control device 1502 to output a control signal 1505 in response to the control instruction 1503 from the control computer 1501, and which opens/closes and controls the breaker 116 in the substation. An operation terminal 1506 is connected to the control computer 1501. An explanation will be given below of an operation of the system when an operator issues the operation instruction 1503 from the operation terminal 1506 to the breaker 116.

When the operator issues the control instruction 1503 to the breaker 116 from the operation terminal 1506 connected to the control computer 1501, the control instruction 1503 is input into the transmitter/receiver unit 14 and the authentication-tag generator unit 13 of the control computer 1501. The authentication-tag generator unit 13 generates the authentication tag 23 by using the control instruction 1503 and the key data 22. The transmitter/receiver unit 14 sends the transmission data 24 that is a combination of the control instruction 1503 and the authentication tag 23 to the control device 1502.

When receiving the data sent as the received data 24a through the transmitter/receiver unit 14 from the control computer 1501, the control device 1502 inputs the control instruction 1503a from the control computer 1501 and in the received data 24a into the control-instruction outputting unit 1504 and the authentication-tag generator unit 13. The authentication-tag generator unit 13 generates the authentication tag 23b for comparison by using the received control instruction 1503a and the key data 22. The generated authentication tag 23b for comparison and the authentication tag 23a in the received data 24a are input into the received-data authentication unit 15. The received-data authentication unit 15 performs authentication verification on whether or not those two authentication tags 23a and 23b match with each other, and passes the verification result 25 to the control-instruction outputting unit 1504.

Only when the verification result 25 indicates "matching of the authentication tags" (a correct control instruction), the control-instruction outputting unit 1504 outputs the control signal 1505 in accordance with the received control instruction 1503a to the breaker 116.

According to the above-explained seventh embodiment, even if control instructions are rewritten in the halfway of the transmission path, it is possible to suppress false device control based on such fraudulent control instructions. Accordingly, a highly reliable substation control system can be provided.

Other Embodiment

The present invention is not limited to the above-explained embodiments, and can be changed and modified in various forms within the scope and spirit of the present invention. That is, device configurations shown in the figures are merely examples showing minimum requisite functional configurations in order to realize the present invention, and specific hardware configuration and software configuration of each unit can be selected accordingly. For example, the present invention can employ a configuration in which, as the transmitter/receiver unit of the protective-control measuring device, a transmitter unit and a receiver unit separated physically are provided or the authentication-tag generator unit for transmission and the authentication-tag generator unit for authentication are individually provided.

The invention claimed is:

1. A protective-control measuring system which comprises a plurality of devices including a protective-control measuring device that performs protective-control measurement on a power system, the plurality of devices being connected together over a transmission path and exchanging data one another, wherein
each device comprises:
a key-data storage unit which stores a set number of key data, the set number being predetermined;
an authentication-tag generator unit which generates an authentication tag by using a transmission target main data and a piece of key data stored in the key-data storage unit;
a transmitter/receiver unit which adds the generated authentication tag to the main data used for generating the authentication tag in order to generate transmission data, sends the transmission data to the transmission path, receives data from the transmission path, and divides the received data into the main data and the authentication tag; and
a received-data authentication unit which authenticates a validity of the received data using the main data and the authentication tag both in the received data received by the transmitter/receiver unit, and the key data stored in the key-data storage unit, and
the protective-control measuring system employs, as an information-theoretic security scheme, a scheme of changing the key data to be used every time upon generation of the authentication-tag by the authentication-tag generator unit, and also employs use-time restriction of prohibiting the use of each key data beyond an upper limit set time of reuse of the key data set in advance in a set period which is predetermined corresponding to an operating period of the protective-control measuring device,
the set number of the key data is determined corresponding to a total sending time of transmission data during the set period and the upper limit set time of reuse of the key data, and a key data size is determined corresponding to the set number of the key data, and thus upon starting operation, the key-data storage unit stores the set number of the key data each having the key data size.

2. The protective-control measuring system according to claim 1, wherein the set number of key data stored in the key-data storage unit is separated into a common fixed key matrix fixedly given and disposable key vectors of the set number, and the authentication-tag generator unit obtains an authentication tag vector y through a following vector calculation:

$$y = xU + v$$

where a vector of the main data is x, the fixed key matrix is U, and the disposable key vector is v.

3. The protective-control measuring system according to claim 1, further comprising a received data discarding unit which discards the received data when the received-data authentication unit determines that the received data is fraudulent, and a recordation unit which records a fraudulent verification result as security information.

4. The protective-control measuring system according to claim 1, wherein the key-data storage unit stores, together with the set number of key data, a same number of key identification information each uniquely identifying each key data, the transmitter/receiver unit is configured to generate the transmission data by adding the generated authentication tag and the key identification information identifying the key data used for generating the authentication tag to the main data, and the received-data authentication unit is configured to perform authentication of the validity of the received data using the key data specified by the key identification information in the received data.

5. The protective-control measuring system according to claim 1, further comprising a setting unit which allows a user to set the key data and an authentication-tag generating algorithm in order to set a probability that received fraudulent data is falsely authenticated as valid data.

6. The protective-control measuring system according to claim 1, wherein when a current-differential protection system is configured which includes a plurality of protection relay devices at a plurality of electric stations, respectively, respective protection relay devices of a plurality of electric stations being connected together through a transmission path, and each protection relay device employing a configuration of the device including the key-data storage unit, the authentication-tag generator unit, the transmitter/receiver unit, and the received-data authentication unit, and which causes each protection relay device to mutually exchange current/voltage sampling data of a protection target with the protection relay device at another electric station, thereby performing current-differential calculation, each protection relay device is configured to:

when sending the sampling data, cause the authentication-tag generator unit to generate an authentication tag by using the protection target sampling data and a piece of key data stored in the key-data storage unit, and cause the transmitter/receiver unit to add the generated authentication tag to the sampling data used for generating the authentication tag in order to generate transmission data; and when receiving data through the transmitter/receiver unit, cause the received-data authentication unit to perform authentication on the received data using the sampling data and the authentication tag both included in the received data and the key data stored in the key-data storage unit, and perform current-differential calculation using the sampling data only when the received data is valid.

7. The protective-control measuring system according to claim 6, wherein each protection relay device is configured to perform current-differential calculation with the value of received data being zero when the received-data authentication unit determines that the received data is fraudulent.

8. The protective-control measuring system according to claim 6, wherein each protection relay device is configured to lock a trip instruction to a breaker when the received-data authentication unit determines that the received data is fraudulent.

9. The protective-control measuring system according to claim 1, wherein when a substation control system is configured which comprises a plurality of control devices each employing a configuration of the device including the key-data storage unit, the authentication-tag generator unit, the transmitter/receiver unit, and the received-data authentication unit, the plurality of control devices being connected together through a transmission path, and which receives a control instruction from a control computer or another control device through each control device in order to control a control target equipment, each control device comprises the key-data storage unit, the authentication-tag generator unit, the transmitter/receiver unit, and the received-data authentication unit set forth in claim 1, and is configured to:

when sending the control instructions, cause the authentication-tag generator unit to generate an authentication tag by using the transmission target control instruction and a piece of key data stored in the key-data storage unit, and cause the transmitter/receiver unit to add the generated authentication tag to the control instructions used for generating the authentication tag in order to generate transmission data; and when receiving data through the transmitter/receiver unit, cause the received-data authentication unit to perform authentication on the received data using the control instructions and the authentication tag both included in the received data and the key data stored in the key-data storage unit, and to control the control target equipment using the control instruction only when the received data is valid.

10. A protective-control measuring device which performs protective-control measurement on a power system and which exchanges data with another device connected through a transmission path, comprising:

a key-data storage unit for storing a set number of key data, the set number being predetermined;

an authentication-tag generator unit which generates an authentication tag by using a transmission target main data and a piece of key data stored in the key-data storage unit;

a transmitter/receiver unit which adds the generated authentication tag to the main data used for generating the authentication tag in order to generate transmission data, sends the transmission data to the transmission path, receiving data from the transmission path, and divides the received data into main data and an authentication tag; and a received-data authentication unit which authenticates validity of the received data using the main data and the authentication tag both in the received data received by the transmitter/receiver unit, and the key data stored in the key-data storage unit, wherein the protective-control measuring device employs, as an information-theoretic security scheme, a scheme of changing the key data to be used every time upon generation of the authentication-tag by the authentication-tag generator unit, and also employs use-time restriction of prohibiting the use of each key data beyond an upper limit set time of reuse of the key data set in advance in a set period which is predetermined corresponding to an operating period of the protective-control measuring device, the set number of the key data is determined corresponding to a total sending time of transmission data during the set period and the upper limit set time of reuse of the key data, and a key data size is determined corresponding to the set number of the key data, and thus upon starting operation, the key-data storage unit stores the set number of the key data each having the key data size.

11. A data transmission method for a protective-control measuring device which performs protective-control measurement on a power system and which exchanges data with another device connected through a transmission path, wherein the protective-control measuring device comprises a key-data storage unit for storing a predetermined set number of key data, the set number being predetermined, and executes:

an authentication-tag generating step of generating an authentication tag by using a transmission target main data and a piece of key data stored in the key-data storage unit;

a sending step of adding the generated authentication tag to the main data used for generating the authentication tag in order to generate transmission data, and of sending the transmission data to the transmission path;

a receiving step of receiving data from the transmission path, and of dividing the received data into main data and an authentication tag; and a received-data authenticating step of authenticating a validity of the received data using the main data and the authentication tag both in the received data received by the transmitter/receiver unit, and the key data stored in the key-data storage unit, and the method employs, as an information-theoretic security scheme, a scheme of changing the key data to be used every time upon generation of the authentication-tag by the authentication-tag generator unit, and use-time restriction of prohibiting the use of each key data beyond an upper limit set time of reuse of the key data set in advance in a set period which is predetermined corresponding to an operating period of the protective-control measuring device, the set number of the key data is determined corresponding to a total sending time of transmission data during the set period and the upper limit set time of reuse of the key data, and a key data size is determined corresponding to the set number of the key data, and thus upon starting operation, the key-data storage unit stores the set number of the key data each having the key data size.

* * * * *